(12) United States Patent
Fox et al.

(10) Patent No.: US 11,919,362 B2
(45) Date of Patent: Mar. 5, 2024

(54) NOISE REDUCING INSERT FOR AN AIR CONDITIONER UNIT

(71) Applicant: Haier US Appliance Solutions, Inc., Wilmington, DE (US)

(72) Inventors: Steven Fox, Louisville, KY (US); Richard Dustin Henderson, La Grange, KY (US)

(73) Assignee: Haier US Appliance Solutions, Inc., Wilmington, DE (US)

( * ) Notice: Subject to any disclaimer, the term of this patent is extended or adjusted under 35 U.S.C. 154(b) by 214 days.

(21) Appl. No.: 17/245,502

(22) Filed: Apr. 30, 2021

(65) Prior Publication Data

US 2022/0348052 A1 Nov. 3, 2022

(51) Int. Cl.
*B60H 1/26* (2006.01)
*B60H 1/00* (2006.01)
*B60H 1/24* (2006.01)

(52) U.S. Cl.
CPC ..... *B60H 1/00364* (2013.01); *B60H 1/00564* (2013.01); *B60H 1/245* (2013.01); *B60H 1/262* (2013.01); *B60H 2001/006* (2013.01)

(58) Field of Classification Search
CPC ............ B60H 1/00364; B60H 1/00564; B60H 1/245; B60H 1/262; B60H 2001/006; B60H 2001/00235
USPC ......................................................... 181/224
See application file for complete search history.

(56) References Cited

U.S. PATENT DOCUMENTS

| 2,172,944 | A |   | 9/1939 | Ralph |
| 4,660,676 | A | * | 4/1987 | Eustace ................ F24F 13/24 454/906 |
| 6,023,938 | A |   | 2/2000 | Lare, Jr. |
| 9,759,439 | B2 | * | 9/2017 | Uhlenbusch ............ F24F 8/158 |
| 9,784,469 | B2 | * | 10/2017 | Ramos ................ F24F 13/0263 |
| 9,975,405 | B2 | * | 5/2018 | Siddiqui .............. B60H 1/3407 |
| 10,683,038 | B2 |   | 6/2020 | Fleckenstein |
| 11,364,772 | B2 | * | 6/2022 | Bei ..................... B60H 1/00364 |
| 11,376,925 | B2 | * | 7/2022 | Williamson ....... B60H 1/00028 |

FOREIGN PATENT DOCUMENTS

| EP | 2433825 A1 | 3/2012 |
| EP | 2527173 B1 | 10/2014 |
| JP | H0755612 B2 | 6/1995 |
| KR | 101173491 B1 | 8/2012 |
| KR | 101312387 B1 | 9/2013 |

OTHER PUBLICATIONS

Machine translation of CN104807167A. Title: Inventor: Gao et al. Published Jul. 2015 (Year: 2015).*

* cited by examiner

*Primary Examiner* — Shawki S Ismail
*Assistant Examiner* — Jennifer B. Olson
(74) *Attorney, Agent, or Firm* — Dority & Manning, P.A.

(57) ABSTRACT

A recreational vehicle and an air conditioner therefor are provided. The air conditioner includes an indoor cover defining an indoor portion and an outdoor portion with an outdoor heat exchanger and an outdoor fan disposed in the outdoor portion and an indoor heat exchanger and an indoor fan disposed in the indoor portion. The air conditioner also includes an indoor panel defining an air inlet and an air outlet. An acoustic insert includes a solid top wall and at least one permeable side wall. The acoustic insert is positioned between the indoor panel and the indoor fan, whereby the acoustic insert dampens sound transmitted through the indoor panel.

20 Claims, 14 Drawing Sheets

NOISE REDUCING INSERT FOR AN AIR CONDITIONER UNIT

FIELD OF THE INVENTION

The present subject matter relates generally to air conditioners in recreational vehicles, and more particularly, to noise reducing inserts for air conditioner units.

BACKGROUND OF THE INVENTION

Certain recreational vehicles include an air conditioning system, referred to generally as a recreational vehicle air conditioner (RVAC), for maintaining a comfortable temperature within the passenger compartment. The air conditioning units are typically mounted on the roof or another exterior location of the recreational vehicle and utilize a sealed system for circulating refrigerant between an indoor and outdoor heat exchanger to facilitate heat transfer. For example, the indoor heat exchanger is positioned within an indoor portion of the RVAC and is in fluid communication with the passenger compartment through an opening in the roof. The outdoor heat exchanger is positioned within the outdoor portion and is separated from the indoor heat exchanger by a partition or divider.

Operation of the RVAC may generate a perceptible, e.g., audible, amount of acoustic noise in the passenger compartment. For example, the rotation of one or more air handlers, such as a blower, may generate perceptible acoustic noise. Also, the speed and quantity of air being moved into, out of, and/or through the passenger compartment by such air handlers may generate perceptible acoustic noise. The total acoustic noise generated by such operation may be distracting or unpleasant within the passenger compartment.

Accordingly, an improved air conditioner unit would be useful. More specifically, a recreational vehicle air conditioner with features for reducing the noise level produced within the passenger compartment of the recreational vehicle by the air conditioner would be particularly beneficial.

BRIEF DESCRIPTION OF THE INVENTION

Aspects and advantages of the invention will be set forth in part in the following description, or may be apparent from the description, or may be learned through practice of the invention.

In one exemplary aspect of the present disclosure, a recreational vehicle air conditioner is provided. The recreational vehicle air conditioner includes an indoor cover defining an indoor portion and an outdoor portion. An outdoor heat exchanger and an outdoor fan are disposed in the outdoor portion and an indoor heat exchanger and an indoor fan are disposed in the indoor portion. The air conditioner also includes an indoor panel defining an air inlet and an air outlet. An acoustic insert includes a solid top wall and at least one permeable side wall. The acoustic insert is positioned between the indoor panel and the indoor fan, whereby the acoustic insert dampens sound transmitted through the indoor panel.

In another exemplary aspect of the present disclosure, a recreational vehicle is provided. The recreational vehicle defines a passenger compartment therein. The recreational vehicle includes a ceiling defining an opening into the passenger compartment and a recreational vehicle air conditioner mounted to the ceiling at the opening. The recreational vehicle air conditioner includes an indoor cover defining an indoor portion and an outdoor portion. An outdoor heat exchanger and an outdoor fan are disposed in the outdoor portion and an indoor heat exchanger and an indoor fan are disposed in the indoor portion. The air conditioner also includes an indoor panel defining an air inlet and an air outlet. An acoustic insert includes a solid top wall and at least one permeable side wall. The acoustic insert is positioned between the indoor panel and the indoor fan, whereby the acoustic insert dampens sound transmitted from the recreational vehicle air conditioner into the passenger compartment.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures.

Figure 1:
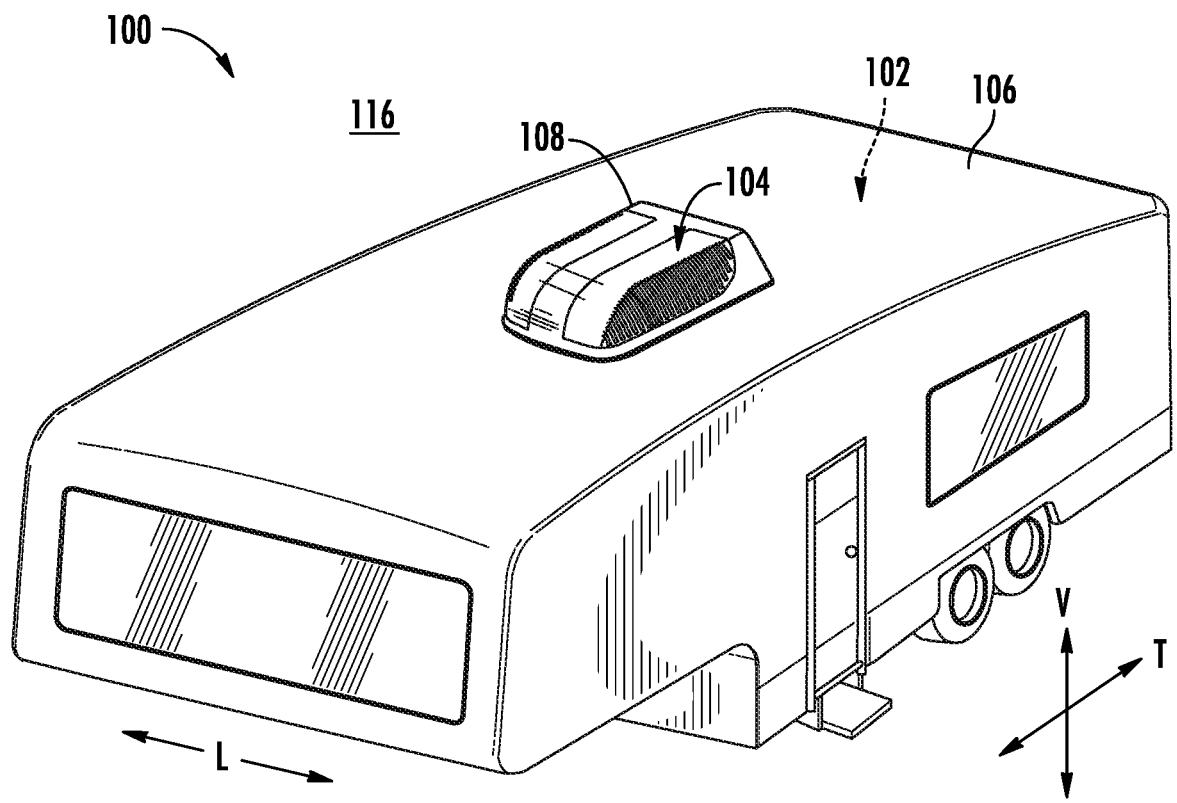
FIG. 1 provides a perspective view of a recreational vehicle according to an exemplary embodiment of the present disclosure.

Repeat use of reference characters in the present specification and drawings is intended to represent the same or analogous features or elements of the present invention.

DETAILED DESCRIPTION

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

In order to aid understanding of this disclosure, several terms are defined below. The defined terms are understood to have meanings commonly recognized by persons of ordinary skill in the arts relevant to the present invention. The terms "includes" and "including" are intended to be inclusive in a manner similar to the term "comprising." Similarly, the term "or" is generally intended to be inclusive (i.e., "A or B" is intended to mean "A or B or both"). The terms "first," "second," and "third" may be used interchangeably to distinguish one component from another and are not intended to signify location or importance of the individual components. In addition, as used herein, terms of approximation, such as "approximately," "substantially," or "about," refer to being within a ten percent margin of error. When used in the context of an angle or direction, such terms include within ten degrees greater or less than the stated angle or direction. For example, "generally vertical" includes directions within ten degrees of vertical in any direction, e.g., clockwise or counter-clockwise.

FIG. 1 provides a perspective view of an exemplary recreational vehicle 100 in accordance with the present disclosure. As may be seen in FIG. 1, the recreational vehicle 100 generally defines a vertical direction V, a lateral direction L, and a transverse direction T, each of which is mutually perpendicular, such that an orthogonal coordinate system is generally defined. People may employ recreational vehicle 100 for a variety of purposes, including transportation, cooking, eating, sleeping, entertaining, and the like. As such, recreational vehicle 100 defines a passenger compartment 102, which may further include a bed, stove, table, restroom, or multiple compartments for storing items that passengers wish to take with them on their travels. Because people often spend significant time within the passenger compartment 102 of recreational vehicle 100, climate control of the passenger compartment 102 is desirable.

Accordingly, an air conditioning system or air conditioner unit 104 may be mounted on recreational vehicle 100 to provide cooled air to the passenger compartment 102. Air conditioner unit 104 is typically mounted to an outside surface 106 of recreational vehicle 100. This arrangement is desirable because a byproduct of operation of air conditioner unit 104 is heated air, which has been passed over a heat exchanger to remove heat from the air circulating within passenger compartment 102. During certain operations, this heated air may be exhausted to the ambient air. As shown in the exemplary embodiment of FIG. 1, air conditioner unit 104 may be mounted on an outer surface 106, such as the top of recreational vehicle 100. Also as shown in FIG. 1, air conditioner unit 104 may include a top cover or outer grille 108 that is positioned over the working components of air conditioner unit 104, e.g., to protect such working components from rain, wind, debris, etc. Although an exemplary recreational vehicle is illustrated, it should be appreciated that air conditioner 104 may be used in or with any suitable recreational vehicle.

Figure 2:
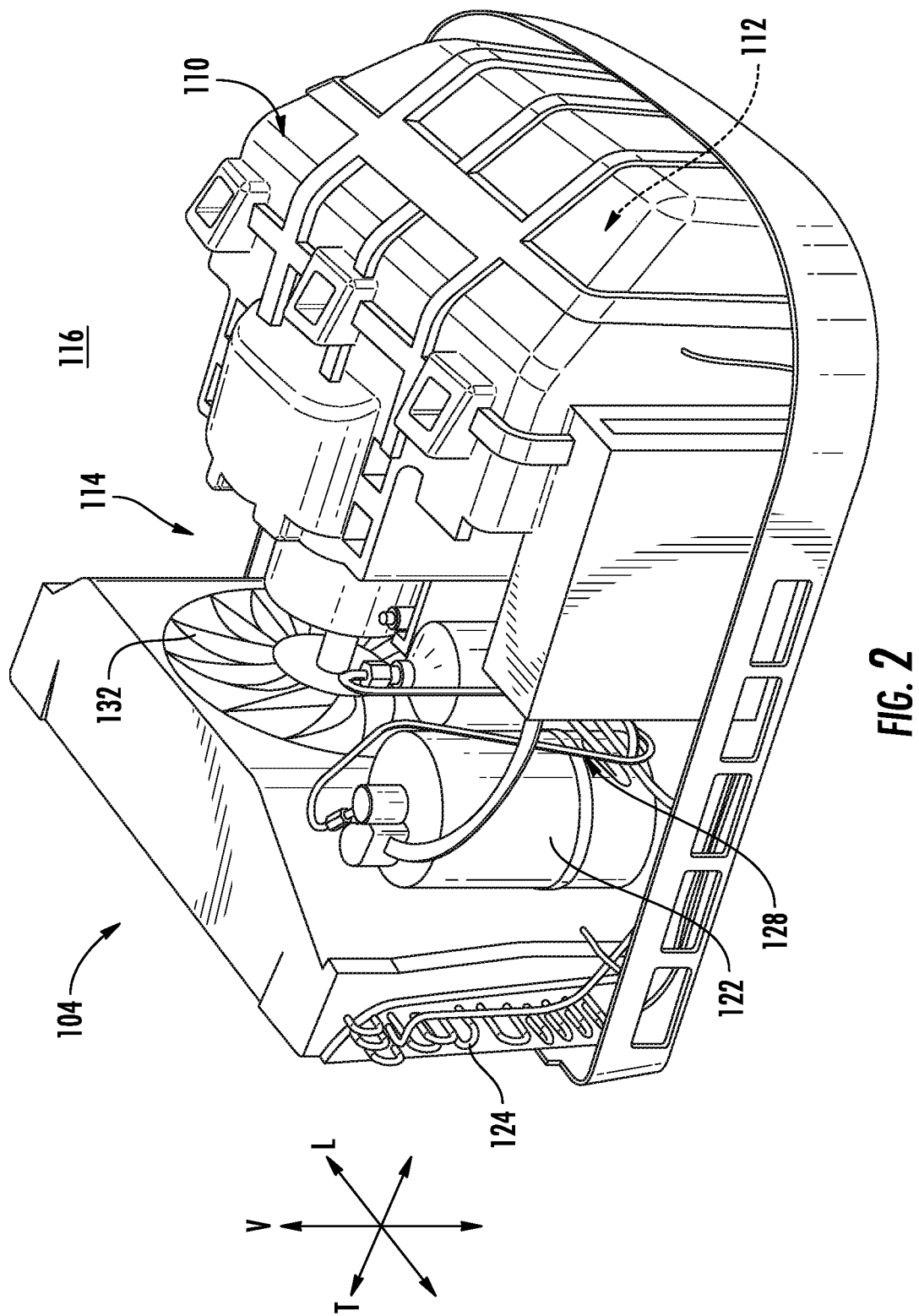
FIG. 2 provides a perspective view of a recreational vehicle air conditioner (RVAC) that may be used with the exemplary recreational vehicle of FIG. 1, with an outdoor cover removed for clarity.
Figure 3:
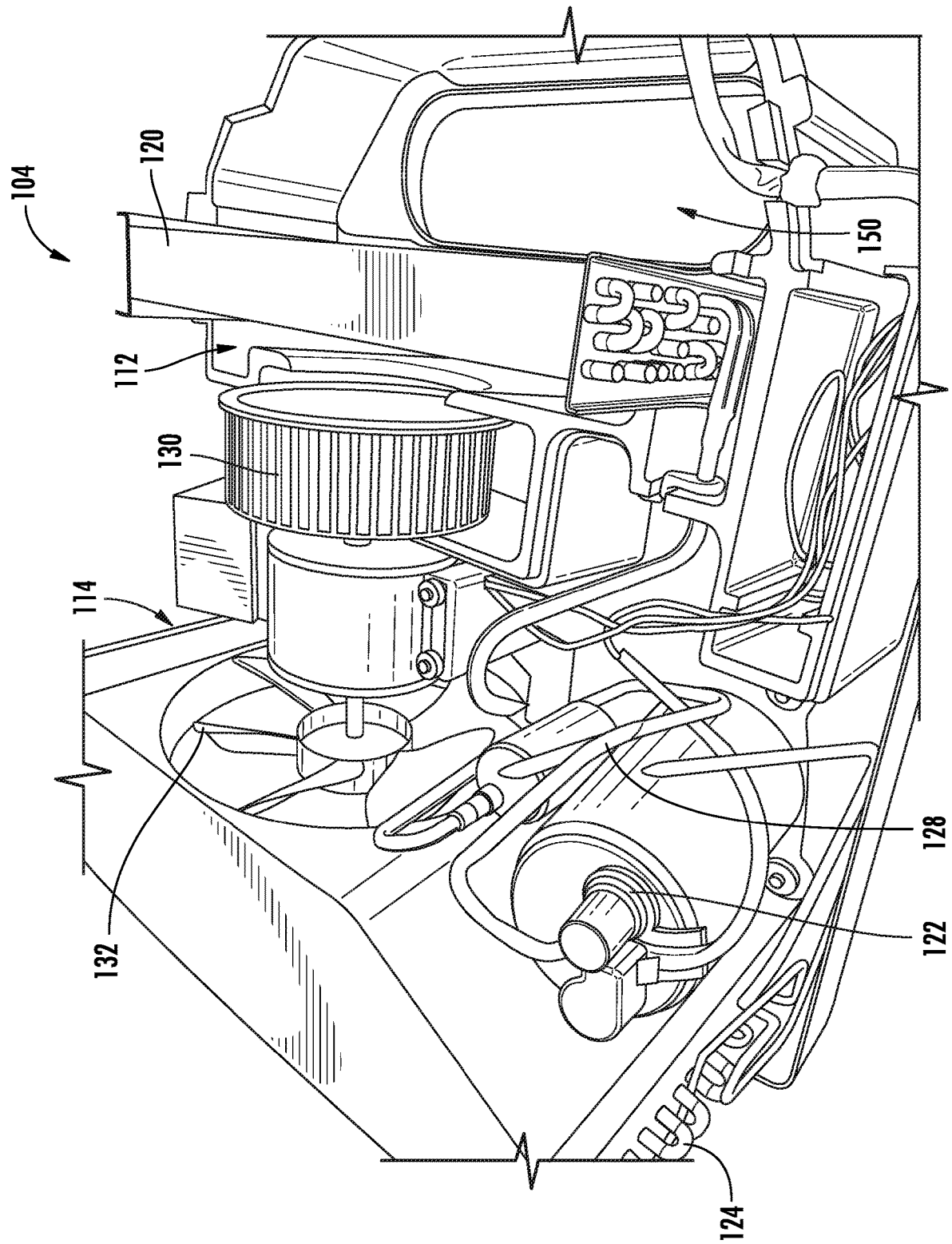
FIG. 3 provides a perspective view of the exemplary RVAC of FIG. 2 with an indoor cover removed for clarity.
Figure 4:
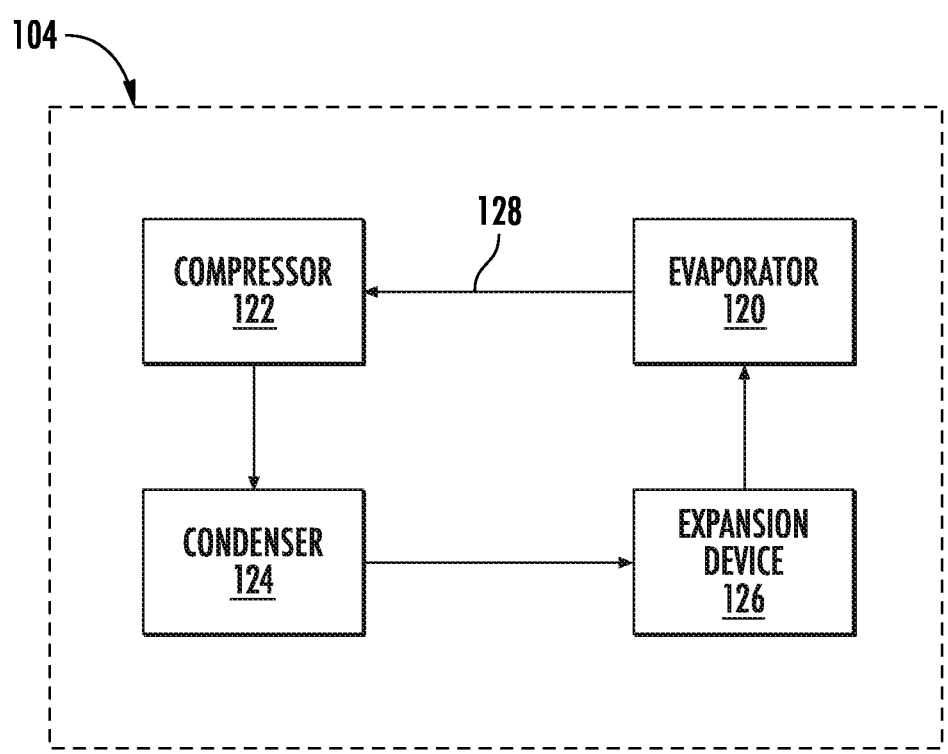
FIG. 4 provides a schematic view of an air conditioner unit according to an exemplary embodiment of the present disclosure.

Referring now generally to FIGS. 2 through 4, the operation of air conditioner unit 104 will be described in more detail according to exemplary embodiments of the present subject matter. In this regard, FIG. 2 illustrates a top, perspective view of air conditioner 104 of recreational vehicle 100 with outer grille 108 removed to reveal internal working components of air conditioner 104. As illustrated, air conditioner unit 104 generally includes an indoor bulkhead or indoor cover 110 that divides air conditioner unit 104 between an indoor portion and an outdoor portion, such as in a packaged terminal air conditioner unit (PTAC) or a split heat pump system. Specifically, indoor cover 110 defines an indoor air plenum 112 and an outdoor air plenum 114. In this regard, indoor cover 110 generally shields the indoor components of air conditioner unit 104 from the outdoor environment 116.

Referring now also to FIG. 3, indoor cover 110 is removed to reveal additional working components of air conditioner unit 104. In addition, FIG. 4 illustrates a schematic view of air conditioner unit 104. Relevant components of air conditioner unit 104 will now be described. It should be understood that air conditioner unit 104 includes various heat pump components, such as a sealed system, for treating air within an interior of an associated recreational vehicle 100. Such components are well understood by those skilled in the art and a description of such components is omitted for the sake of brevity.

In this regard, for example, air conditioner unit 104 includes refrigerant circulating between evaporator 120, compressor 122, condenser 124, and expansion device 126, as shown in the refrigeration loop 128 of air conditioner unit 104 in FIGS. 2 through 4. Refrigerant, also known as coolant, carries heat from the passenger compartment 102 of recreational vehicle 100 to the outdoors 116 (e.g., ambient area surrounding outer surface 106 of the passenger compartment 102). Refrigerant is useful because it changes states from a liquid to a vapor at convenient temperatures for a refrigeration cycle. One suitable refrigerant for use in refrigeration loop 128 is 1,1,1,2-Tetrafluoroethane, also known as R-134A, although it should be understood that the present disclosure is not limited to such example and that any suitable refrigerant may be utilized. For example, according to an exemplary embodiment, the refrigerant may be R-410A or another refrigerant.

The refrigerant begins by passing through evaporator 120 in liquid form. Ambient air or air from the passenger compartment 102 may pass over evaporator 120, e.g., as motivated by an evaporator air handler. More specifically, as illustrated, air conditioner unit 104 may include an indoor fan 130, such as a blower fan 130 as illustrated in FIG. 3, configured for urging a flow of indoor air. Because the liquid refrigerant is cold in this low-pressure state, it absorbs heat from the air passed over it, cooling the air for delivery to the passenger compartment 102. As the liquid refrigerant absorbs heat, it evaporates into a vapor. From there, the gaseous refrigerant is delivered to compressor 122, which increases the pressure of the refrigerant, thus raising its temperature well above the ambient temperature outside of recreational vehicle 100. From compressor 122, the heated refrigerant is delivered to condenser 124. Air may pass over condenser 124, e.g., as motivated from a condenser air handler. More specifically, as illustrated, air conditioner unit 104 may include an outdoor fan 132 configured for urging a flow of outdoor air, thereby facilitating heat transfer from the heated refrigerant to the ambient air. In releasing this heat energy, the refrigerant condenses back into liquid form. Next, the refrigerant is delivered to expansion device 126, where the pressure of the refrigerant is reduced, thus decreasing its temperature. The cooled, liquid refrigerant is then delivered back to evaporator 120 to repeat the process.

Figure 5:
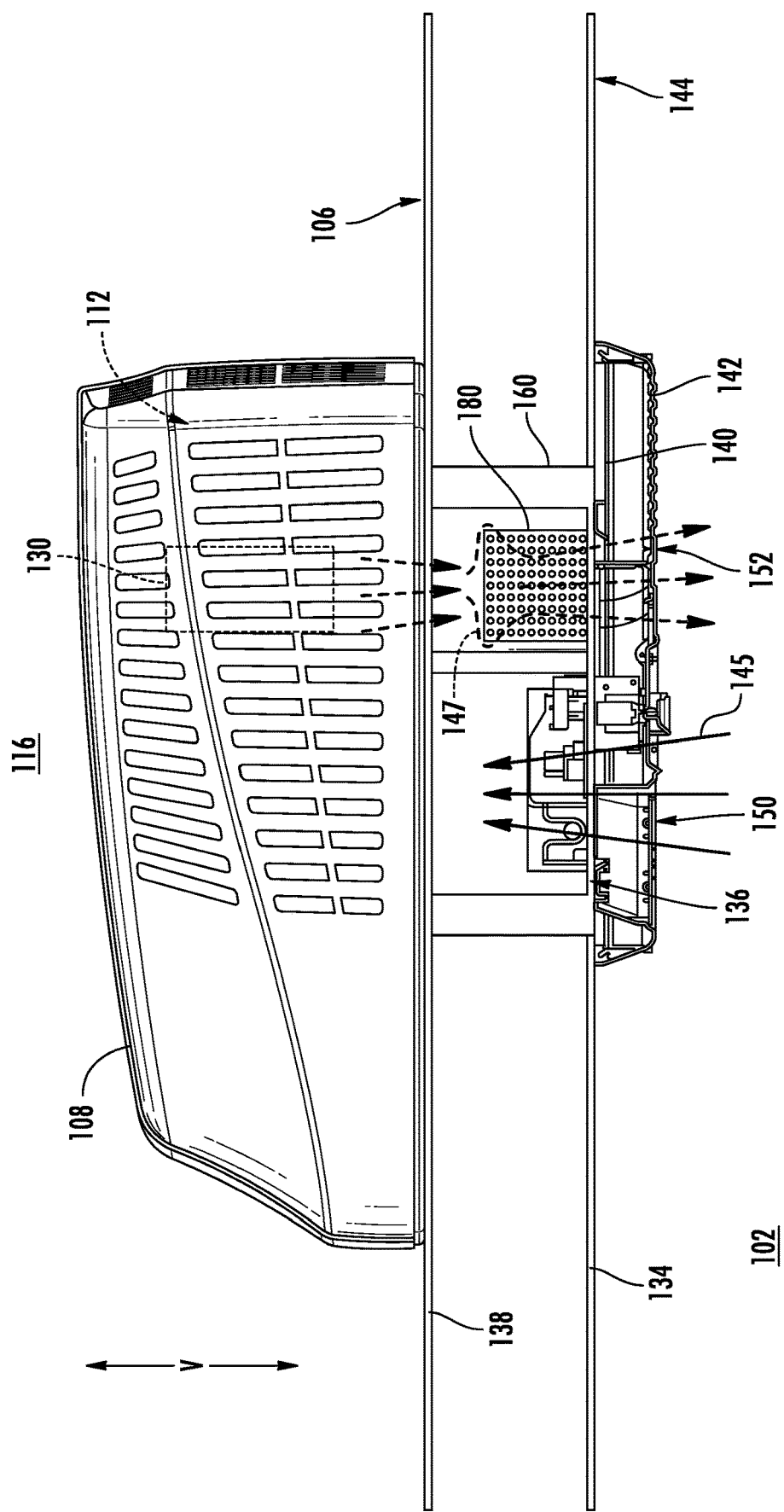
FIG. 5 is a schematic side view of the exemplary air conditioner unit of FIG. 2 mounted on a ceiling of a recreational vehicle according to an exemplary embodiment of the present subject matter.

FIG. 5 provides a side schematic view of air conditioner unit 104 mounted atop of recreational vehicle 100. As explained above, air conditioner unit 104 is mounted to outer surface 106 of the recreational vehicle 100, e.g., with one portion of the air conditioner unit 104 mounted on a roof 138 of the recreational vehicle 100, a second portion of the air conditioner unit 104 mounted on a ceiling 134 of the recreational vehicle 100, and additional components of the air conditioner unit 104 are positioned between the roof 138 and the ceiling 134. As illustrated in FIG. 5, air conditioner 104 is seated over an opening 136 within ceiling 134, e.g., to cover opening 136, such as with an indoor panel 140 and an indoor grille 142 of air conditioner unit 104 covering the opening 136. The indoor panel 140 may be mounted within passenger compartment 102 by passing a plurality of bolts or other suitable mechanical fasteners through indoor panel 140. According to an exemplary embodiment, indoor panel 140 is a substantially rigid metal plate that has one or more apertures for receiving such fasteners.

The air conditioner unit 104 may further include an indoor grille 142 that is positioned over indoor panel 140. For example, indoor grille 142 may be mounted on inner surface 144 of ceiling 134 of recreational vehicle 100, e.g., within an interior or passenger compartment 102 of recreational vehicle 100. For example, indoor grille 142 may be secured directly to indoor panel 140 using one or more mechanical fasteners and/or may snap on to the indoor panel 140, such as with tabs and corresponding slots. Although indoor panel 140 and indoor grille 142 are illustrated herein as two separate components, it should be appreciated that according to exemplary embodiments both indoor panel 140 and indoor grille 142 may be provided as a single component. In addition, these components may be formed from any suitable material and may have any suitable shape, configuration, and mounting mechanisms.

Indoor grille 142 may overlay and hide components of air conditioner unit 104 to provide a pleasant cosmetic appearance for air conditioner unit 104 when viewed from passenger compartment 102. In addition, indoor grille 142 may facilitate filtering air circulated through the air conditioner 104. For example, indoor grille 142 may also include, e.g., louvers, perforated sections, and/or other air flow apertures, to allow air to flow through indoor grille 142. Indoor panel 140 and/or indoor grille 142 may also include a removable filter cover (not shown) mounted thereto and the filter cover may include, e.g., louvers, perforations, and/or other openings to allow air flow through the filter cover. For example, the filter cover may support or hold a filter medium, such as a concertinaed or pleated fabric filter, fiberglass filter, etc., that filters air entering air conditioner unit 104 at air inlet 150.

For example, indoor grille 142 and indoor panel 140 may include an air inlet 150 and an air outlet 152 through which air circulates between the passenger compartment 102 of the recreational vehicle 100 and the indoor air plenum 112 (FIGS. 2 and 3) of the air conditioner unit 104. Such air may also sometimes be referred to as "indoor air," e.g., as distinct from outdoor air which circulates through the outdoor portion 114 of the air conditioner unit 100. Air inlet and outlet 150, 152 may be separate from each other on indoor panel 140. Relatively warm air 145 from within passenger compartment 102 of recreational vehicle 100 may flow through indoor grille 142 and indoor panel 140 via air inlet 150, and such air may be treated (e.g., heated or cooled) by a sealed system of air conditioner 104, and in particular the indoor heat exchanger (evaporator) 120 thereof (see, e.g., FIGS. 2 through 4). The resultant treated air 147 may then flow back into the passenger compartment 102 through indoor grille 142 and indoor panel 140 via air outlet 152.

In particular embodiments, the air conditioner unit 104 may also include an acoustic insert 180 positioned between the indoor panel 140 and the indoor fan 130, such as directly between the indoor panel 140 and the indoor fan 130. For example, the indoor panel 140 and the indoor fan 130 may be generally aligned along the vertical direction V, such as colinear along a line that is generally parallel to the vertical direction V, and the acoustic insert 180 may also be positioned along the same generally vertical line, such as concentric with the indoor fan 130 and/or air outlet 152 and centered on the same generally vertical line. As will be described in more detail below, the acoustic insert 180 may be a noise reducing insert, e.g., the acoustic insert 180 may dampen sound transmitted from the air conditioner unit 104, and in particular from the indoor fan 130, to the passenger compartment 102, such as through the indoor panel 140.

In some embodiments, the air conditioner unit 104 may provide a cooling capacity of about twelve thousand British Thermal Units (BTU) per hour (12 kBTU/hr) or more, such as about 13.5 kBTU/hr or more, such as about 15 kBTU/hr or more, such as about 18 kBTU/hr. Also, the air conditioner unit 104 may provide an air flow rate within the passenger compartment of about one hundred cubic feet per minute (CFM) or more, such as about 150 CFM or more, such as about 200 CFM or more, such as about 300 CFM. The air conditioner unit 104 may be configured to and/or operable to provide such cooling and/or air flow rates at least in part by the size and location of the indoor fan 130. As mentioned above and as shown in FIG. 3, the indoor fan 130 may be a blower fan. In particular, the blower fan 130 may include a six inch (6") or larger blower wheel, such as an eight inch (8") or larger blower wheel, such as a ten inch (10") or larger blower wheel. The blower wheel may be positioned directly above the opening 136. In operation, the blower fan 130 sized and located as described herein may be a main source of acoustic noise that is generated by the air conditioner unit 104 and is perceptible (e.g., audible by a person of average hearing acuity) within the passenger compartment 102. Thus, the acoustic insert 180 may be provided to reduce or dampen such noise. For example, typical sound levels throughout the passenger compartment 102 during operation of an RVAC vary from location to location within the passenger compartment 102 generally within a range of about sixty two decibels (62 dB) to about seventy four decibels (74 dB), and the acoustic insert 180 may reduce such sound levels at each location in the passenger compartment 102, such as by about 3 dB or more, such as by about 4 dB or more, such as by about 5 dB or more, such as by about 6 dB or more at each location in the passenger compartment 102.

As mentioned, the acoustic insert 180 may reduce the level of noise transmitted to the passenger compartment 102. For example, the acoustic insert 180 may define a tortuous flow path for the treated air 147, e.g., as illustrated in FIG. 5, flowing into the passenger compartment 102 from the indoor blower fan 130 via the indoor panel 140 and the indoor grille 142. The acoustic insert 180 may include a solid top wall 182 (see, e.g., FIGS. 6 through 8) that at least partially obstructs straight-line flow paths from the blower 130 into the passenger compartment 102. As used herein, the solid top wall 182 is "solid" in that the wall extends continuously from edge to edge in every direction with no gaps or openings therein through which air may pass. Thus, the treated air 147, in such embodiments, is forced to travel around the top wall 182 of the acoustic insert 180, thereby reducing the velocity of the treated air 147 and also the amount of acoustic noise generated by the air 147. The acoustic insert 180 may also include at least one permeable side wall (examples of which are described in more detail below and further illustrated, e.g., in FIGS. 6-8, 11, 13, and 14), whereby the air 147, after diverting around the solid top wall 182, passes through the at least one permeable side wall before entering the passenger compartment 102 via the outlet 152. The at least one permeable side wall may include a plurality of apertures (which make the side wall permeable), and the plurality of apertures may be configured, e.g., sized and positioned, to provide a diffuse, and thereby quiet, flow of air 147 to the outlet 152. Further, the solid top wall 182 of the acoustic insert 180 may directly block or impede sound transfer from the indoor fan 130 to the passenger compartment 102, such as through the indoor panel 140 and/or outlet 152.

According to the illustrated embodiment, air inlet 150, air outlet 152, and acoustic insert 180 all have substantially rectangular cross-sections in a plane that is perpendicular to the vertical direction V. However, it should be appreciated that the cross-sectional shape and size may vary while remaining within the scope of the present subject matter.

Figure 6:
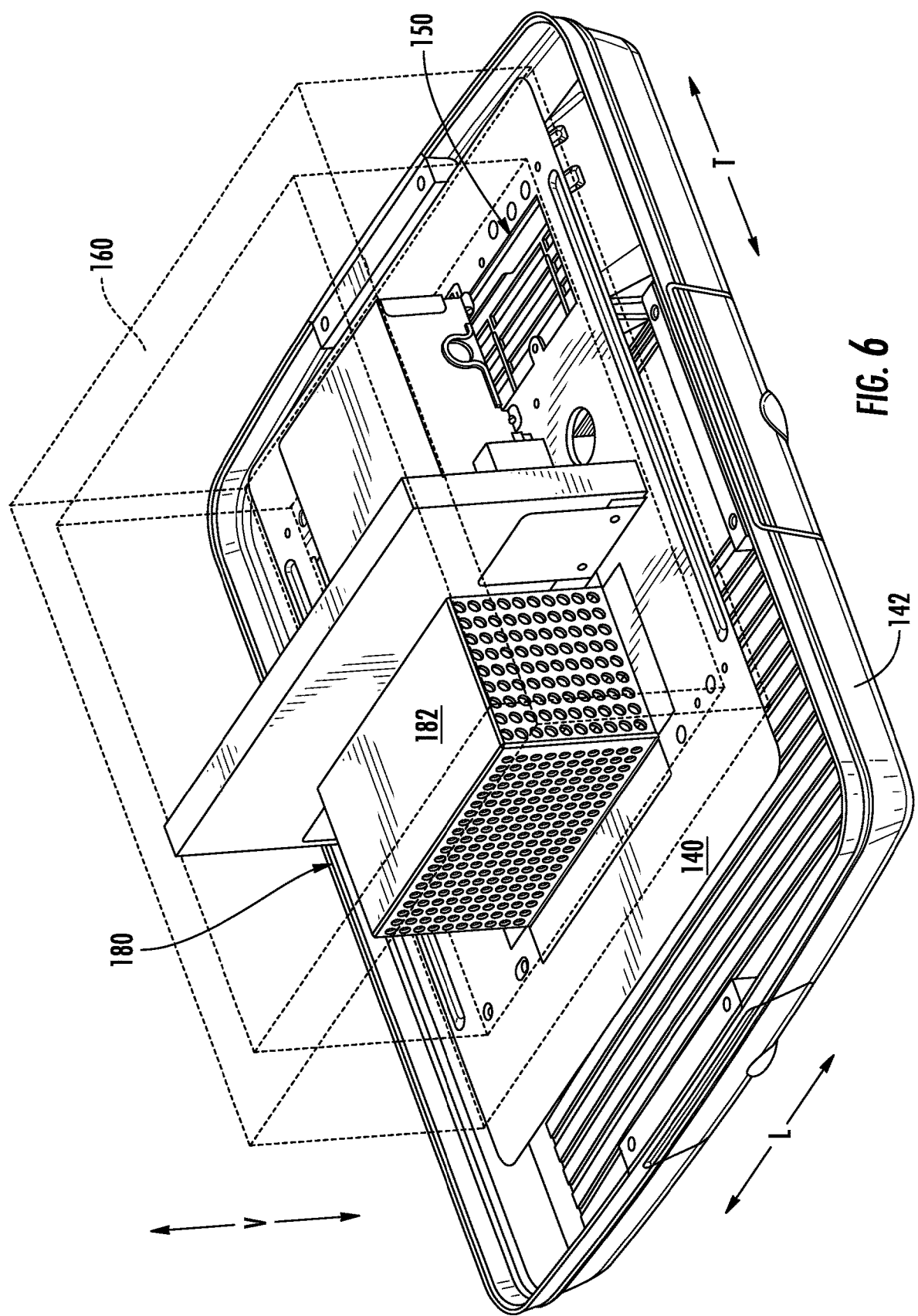
FIG. 6 is a perspective view of a portion of the exemplary RVAC of FIG. 5.

As illustrated in FIG. 6, in some embodiments, the acoustic insert 180 may be mounted directly to the indoor panel 140. For example, the acoustic insert 180 may be positioned over and around the air outlet 152. In some embodiments, the acoustic insert 180 may be mounted to the indoor panel 140 directly above the air outlet 152, e.g., such that the solid top wall 182 of the acoustic insert 180 completely obstructs any straight line flow paths along the vertical direction V through the air outlet 152. Accordingly, the treated air 147 may thereby flow into the passenger compartment 102 along tortuous flow paths, e.g., as described above with respect to FIG. 5.

Figure 7:
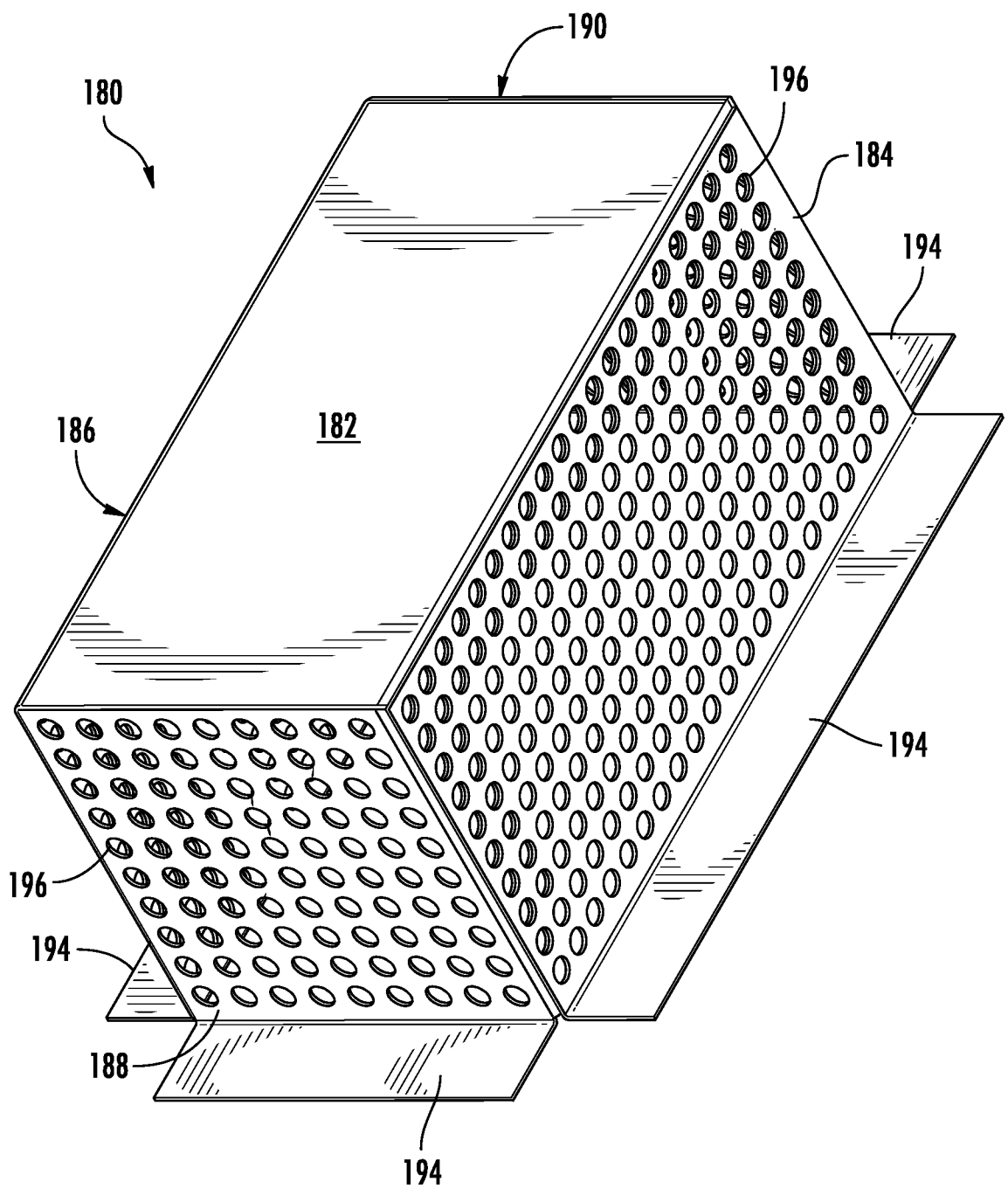
FIG. 7 a perspective view of an acoustic insert according to an exemplary embodiment of the present subject matter which may be incorporated into an RVAC such as the exemplary air conditioner unit of FIG. 5.
Figure 8:
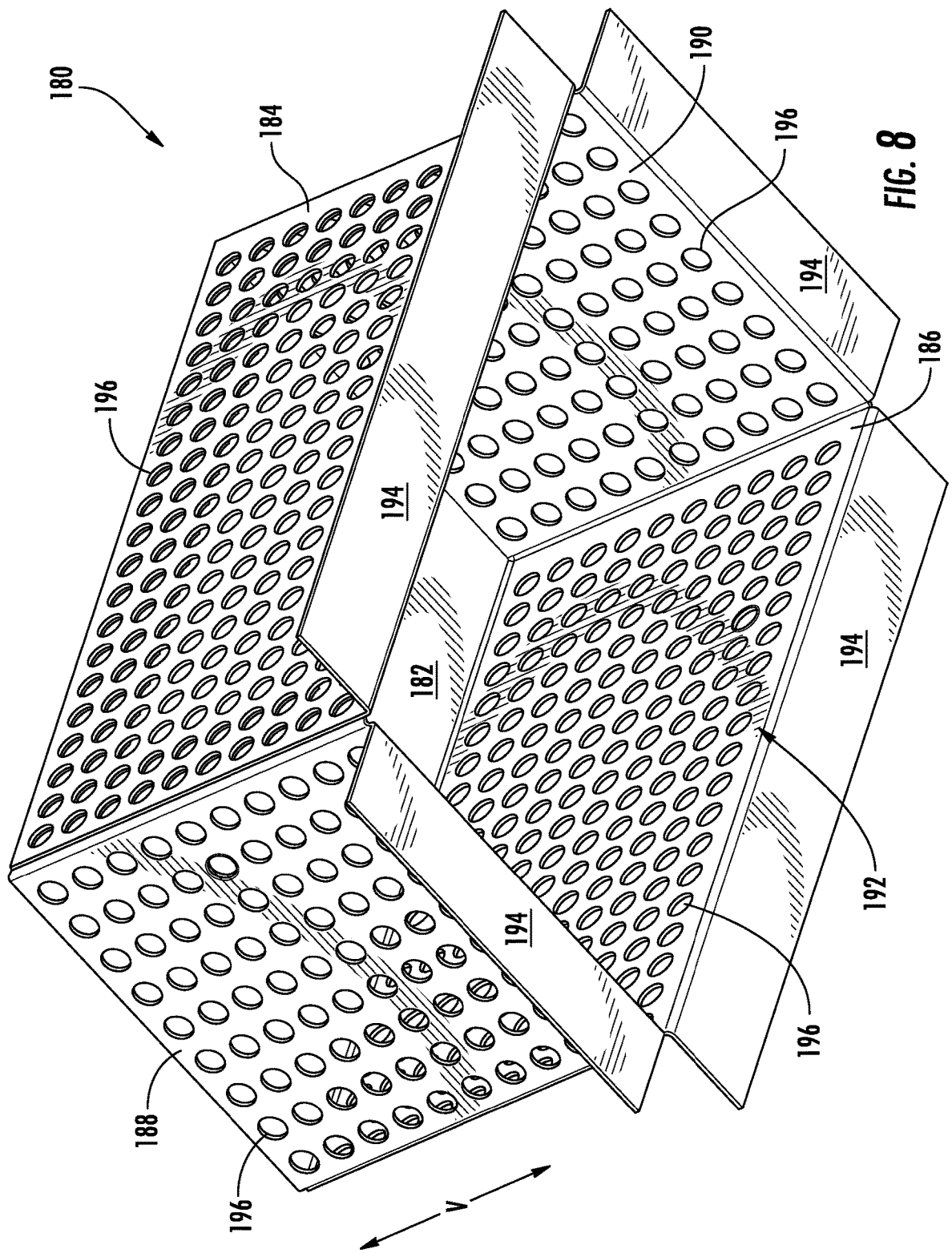
FIG. 8 is another perspective view of the acoustic insert of FIG. 7.
Figure 9:
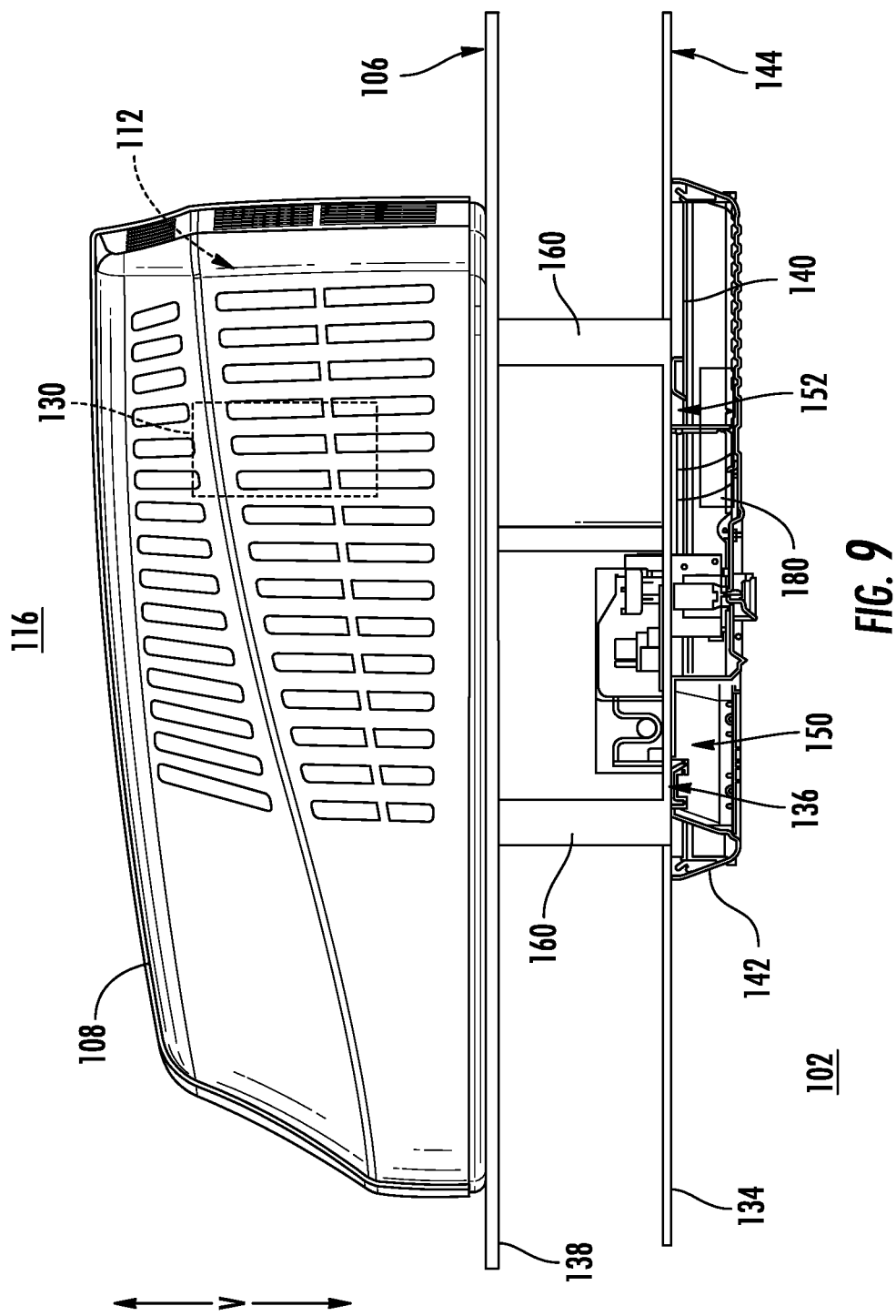
FIG. 9 is a schematic side view of the exemplary air conditioner unit of FIG. 2 mounted on a ceiling of a recreational vehicle according to an additional exemplary embodiment of the present subject matter.

As may be seen, e.g., in FIGS. 7 and 8, the acoustic insert 180 may, in some embodiments, generally define a box shape, e.g., comprising six rectangular sides. The sides of the box shape of the acoustic insert 180 may include and/or be defined by the solid top wall 182 and a plurality of side walls. At least one of the side walls may be permeable, e.g., may permit air flow therethrough. In some embodiments, the acoustic insert 180 may include one sidewall, e.g., a continuous curved side wall, such as a cylindrical side wall, and the one side wall may be permeable, e.g., may include at least one aperture through the side wall which permits air flow therethrough. In additional embodiments, the acoustic insert 180 may include multiple side walls, e.g., a plurality of side walls, such as four side walls as in the exemplary embodiment illustrated in FIGS. 7 and 8, and at least one of the multiple side walls may be permeable, up to and including all of the side walls being permeable, e.g., as illustrated in FIGS. 7 and 8.

Referring again specifically to FIGS. 7 and 8, in embodiments where the acoustic insert 180 generally defines a box shape, the acoustic insert 180 may include a plurality of side walls, e.g., four side walls, and at least one of the side walls may be permeable, such as two permeable side walls or, as illustrated, all four side walls may be permeable. In particular, the acoustic insert 180 may include a front side wall 184 and a rear side wall 186 spaced apart from the front side wall 184 along the transverse direction T (see, e.g., FIG. 6), and a left side wall 188 spaced apart from a right side wall 190 along the lateral direction L (see, e.g., FIG. 6). The plurality of sidewalls 184, 186, 188, and 190 may extend along the vertical direction V from the solid top wall 182 to an open bottom end 192 (FIG. 8) of the acoustic insert 180, where the open bottom end 192 defines the sixth side of the box shape. The acoustic insert 180 may also include a plurality of flanges 194 extending from a bottom edge of one or more of the plurality of sidewalls 184, 186, 188, and 190. The acoustic insert 180 may be attached to the indoor panel 140 and/or indoor grille 142 by the flanges 194, such as by welding the flanges 194 to the indoor panel 140, by mechanical fasteners extending through the flanges 194 and the panel/grille 140/142, and/or any other suitable means of attachment.

The one or more permeable side walls may each include one or more apertures through the respective wall. For example, in some embodiments, the at least one permeable side wall may be perforated, e.g., may include a plurality of apertures 196, such as circular holes as illustrated, through each permeable side wall. As illustrated in FIGS. 7 and 8, the apertures 196 may be uniform and regular, e.g., the apertures 196 may be uniform in shape and size and may be positioned in a regular arrangement, e.g., a grid, matrix, or array which is evenly spaced. In other embodiments, the apertures 196 may be non-uniform and/or may be positioned in an irregular arrangement, such as the apertures 196 may vary in size or shape, or may be disposed in various patterns with equal or varying spacing between the apertures 196.

FIGS. 9 through 14 illustrate additional embodiments of the present disclosure, e.g., where the air conditioner unit 104 is part of a ducted system. As illustrated, e.g., in FIGS. 5, 9, and 12, the air conditioner unit 104 may include a sleeve 160 which extends between the roof 138 of the recreational vehicle 100 and the ceiling 134 of the recreational vehicle 100, such as from the outer grille 108 of the air conditioner unit 104 to the indoor panel 140 or indoor grille 142.

In embodiments where the air conditioner unit 104 is part of a non-ducted system, e.g., as illustrated in FIGS. 5 and 6, the sleeve 160 may be a non-ducted sleeve, e.g., the sleeve 160 is solid and continuous in all directions from the roof 138 to the ceiling 134, such that air flow from components of the air conditioner unit 104 at or above the roof 138 (such as the indoor fan 130) is fully directed to the indoor panel 140 and/or grille 142 therebelow, without any cross-flow (e.g., non-vertical flow) between the roof 138 and the ceiling 134 other than within the sleeve 160. For example, in non-ducted embodiments, the air flow may be only between components which are generally aligned along the vertical direction V, with outflow from the sleeve 160 only at a bottom end of the sleeve 160.

In embodiments where the air conditioner unit 104 is a part of a ducted system, one or more ducts (not shown) may be included within the recreational vehicle 100, such as between the roof 138 and the ceiling 134, to distribute chilled or otherwise treated air to disparate areas within the passenger compartment 102, e.g., to additional outlets spaced apart horizontally from the sleeve 160, where "horizontally" refers to generally along the lateral direction L, the transverse direction T, or both, and/or within a horizontal plane that is perpendicular to the vertical direction V and is defined by the lateral direction L and the transverse direction T (it being understood that such outlets are spaced apart at least horizontally and may also be vertically spaced apart from the sleeve 160 and/or air conditioner unit 104).

Figure 12:
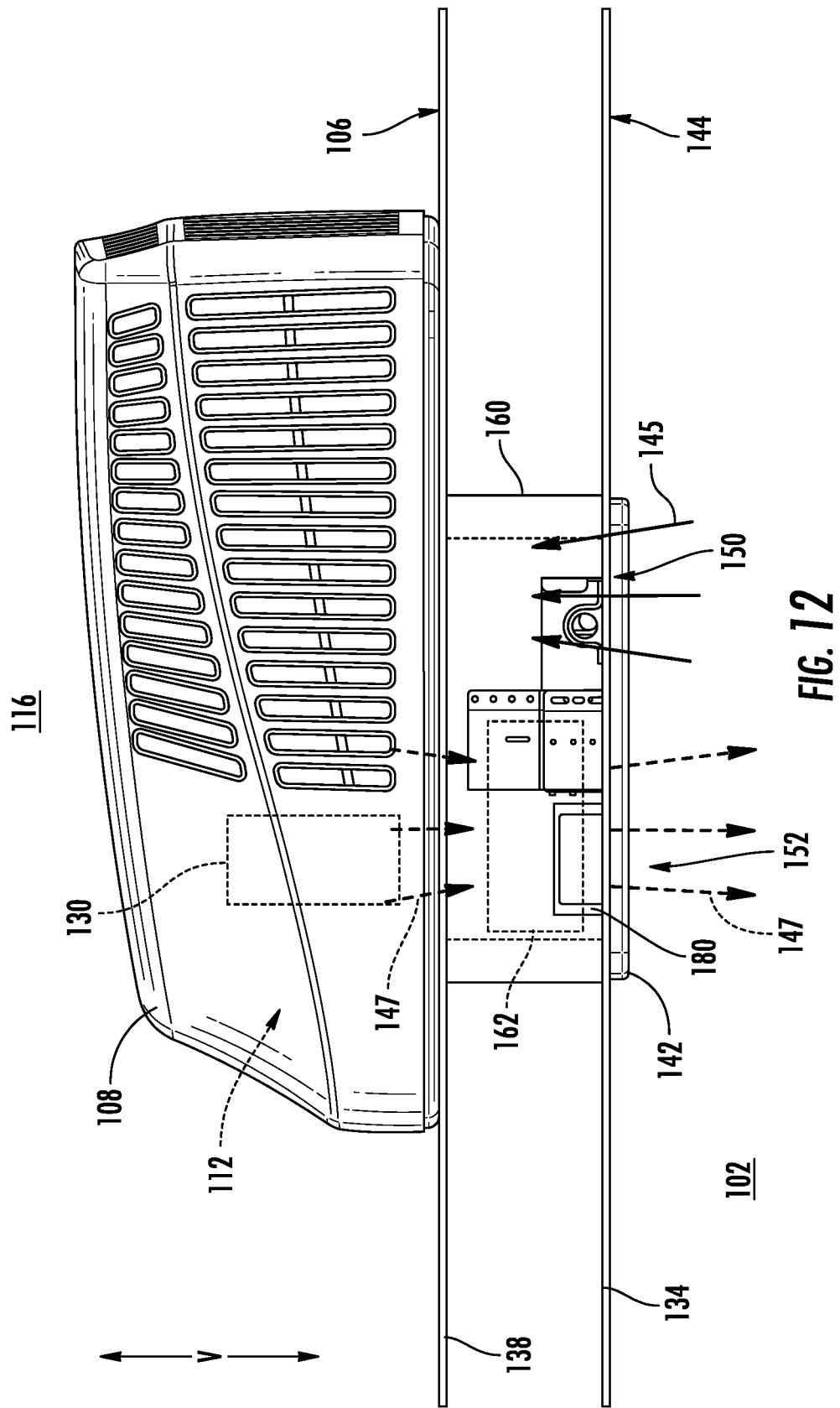
FIG. 12 is schematic side view of the exemplary air conditioner unit of FIG. 2 mounted on a ceiling of a recreational vehicle according to yet another exemplary embodiment of the present subject matter.
Figure 13:
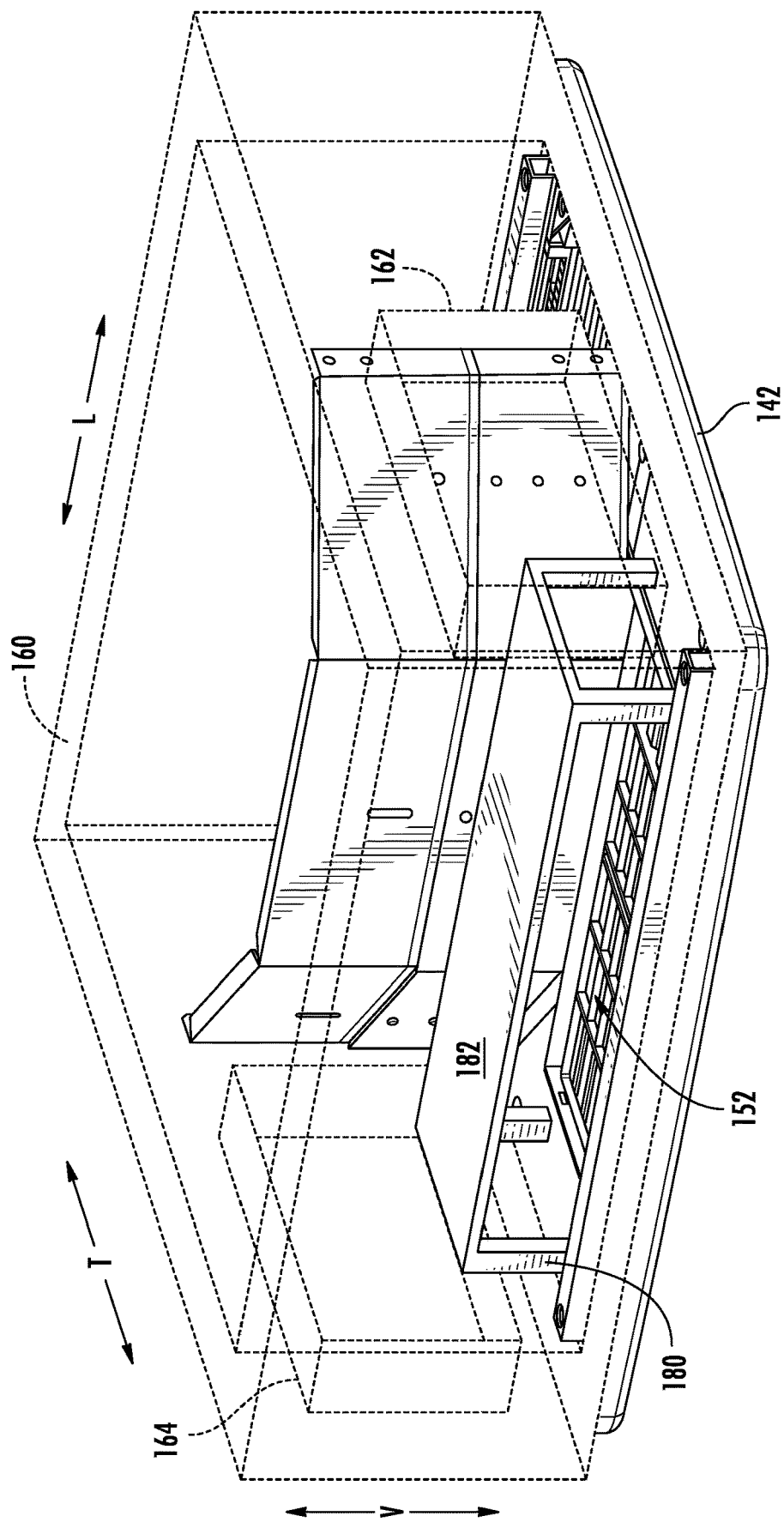
FIG. 13 is a perspective view of a portion of the exemplary RVAC of FIG. 12.

As may be seen, e.g., in FIGS. 12 and 13, in ducted embodiments, the sleeve 160 may include one or more duct connecting ports. Those of ordinary skill in the art will recognize that the duct connecting port or ports may comprise a short stub or nipple sized to be coupled with a correspondingly shaped duct, e.g., the connecting port(s) may have a rectangular cross-sectional shape for mating with (e.g., being received snugly within) a rectangular shaped duct. For example, the sleeve 160 may include a first duct connecting port 162 and a second duct connecting port 164 which are opposite one another and are spaced apart along the lateral direction L. In such embodiments, the first duct connecting port 162 and the second duct connecting port 164 may be generally aligned with each other. Further, in such embodiments, the acoustic insert 180 may be aligned with each of the first duct connecting port 162 and the second duct connecting port 164 and may be positioned between the first duct connecting port 162 and the second duct connecting port 164.

Figure 10:
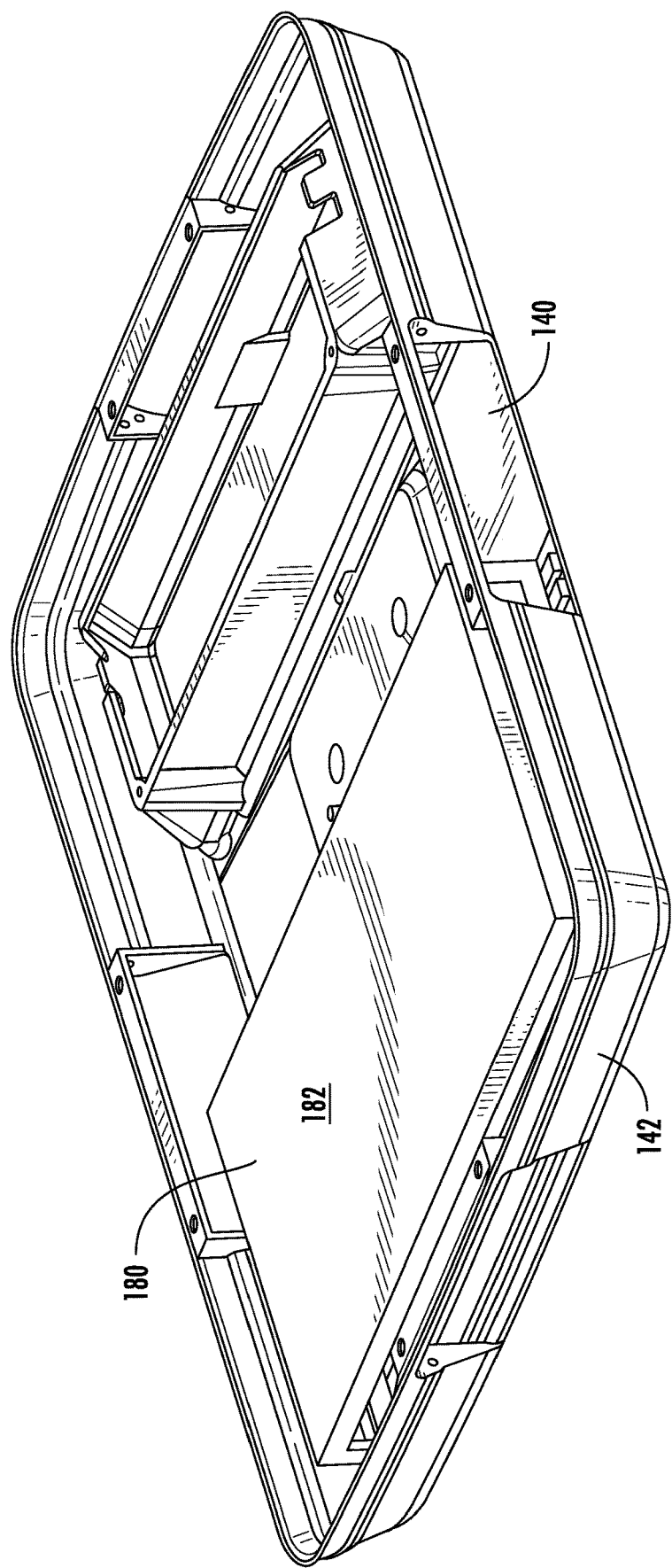
FIG. 10 is a perspective view of a portion of the exemplary RVAC of FIG. 9.
Figure 11:
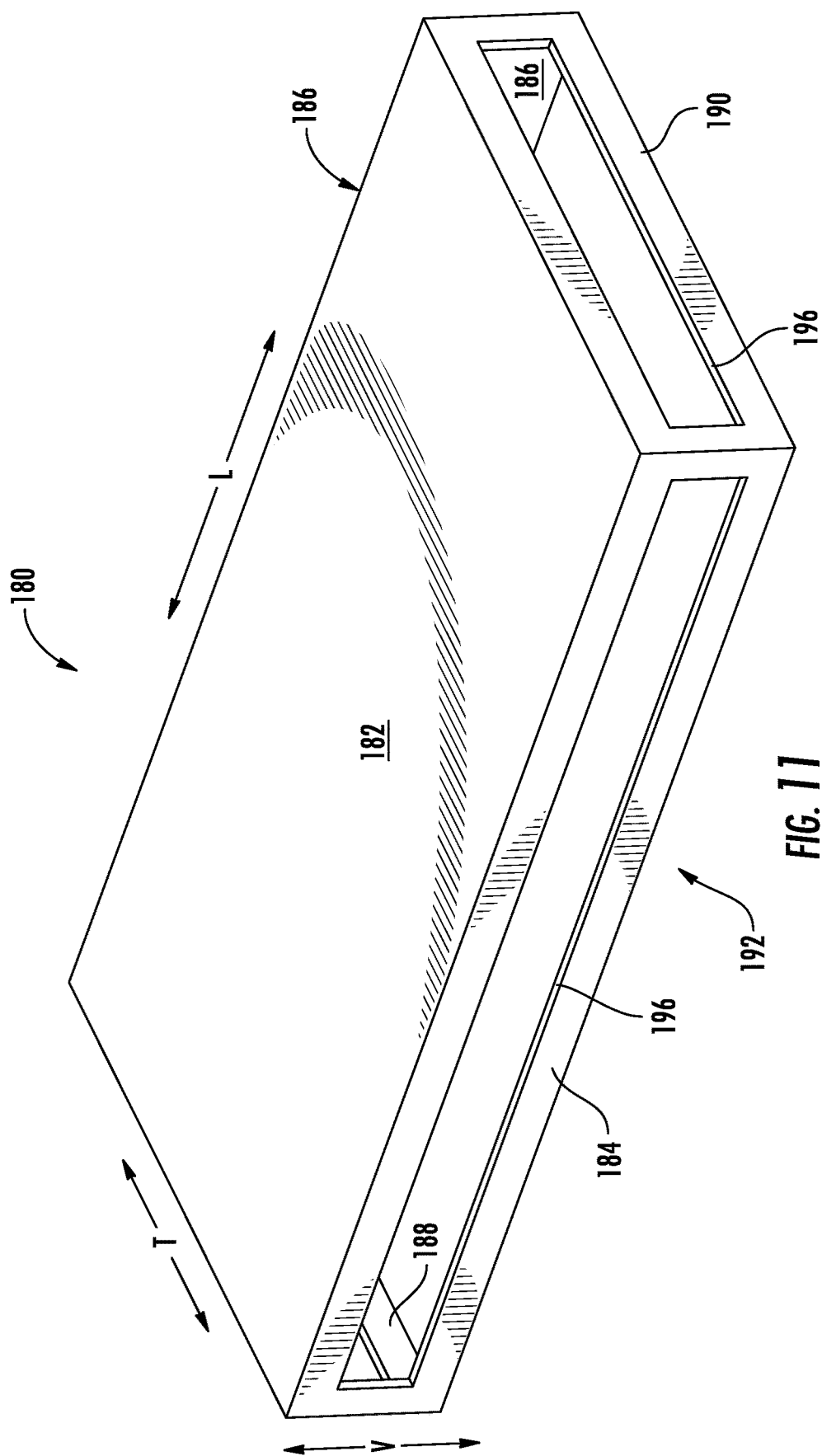
FIG. 11 is a perspective view of an acoustic insert according to an additional exemplary embodiment of the present subject matter which may be incorporated into an RVAC such as the exemplary air conditioner unit of FIG. 9.
Figure 14:
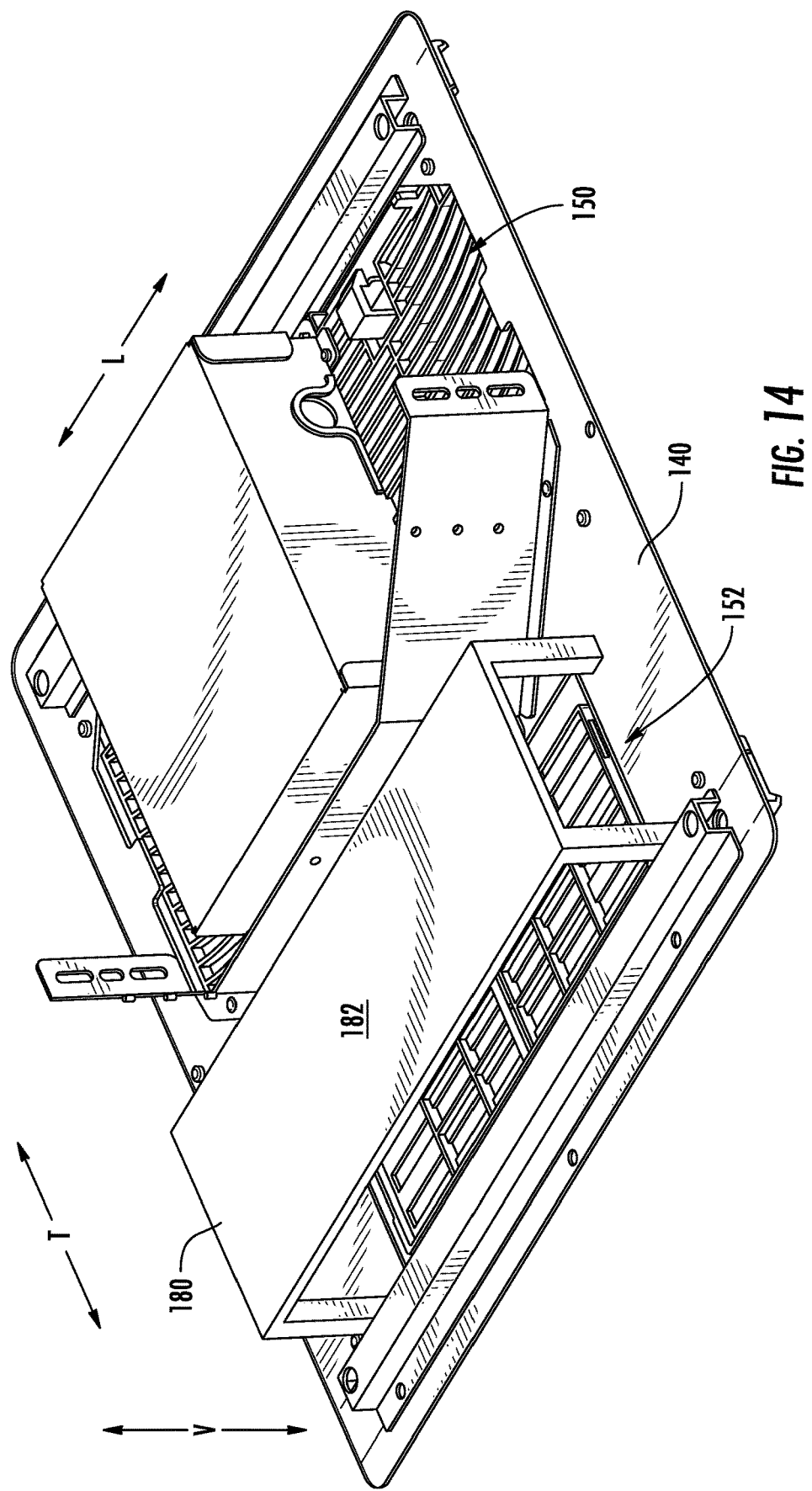
FIG. 14 is another perspective view of a portion of the exemplary RVAC of FIG. 12.

In some embodiments, e.g., as illustrated in FIGS. 10 and 11, the permeable side wall or side walls may include a single aperture 196. For example, the single aperture 196 may be a single slot 196 which is cut out from each permeable side wall, e.g., where an outer frame portion of the side wall remains on each side of the single slot 196 in each permeable side wall, as illustrated in FIGS. 10 and 11. In some embodiments, e.g., as illustrated in FIGS. 13 and 14, the single slot 196 may extend all the way to one edge, e.g., a bottom edge, of each permeable side wall. In various embodiments where the aperture is provided as the single slot 196, the respective side wall may define a height, e.g., generally along the vertical direction V, and a length generally perpendicular to the height, e.g., generally along a direction perpendicular to the vertical direction V, such as one of the lateral direction L or the transverse direction T. Further, in such embodiments, the single slot 196 may extend across a majority of the length and a majority of the height of the at least one permeable side wall. For example, as may be seen particularly in FIGS. 11 and 14, the single slot 196 may extend across about two-thirds or more of the length of each respective permeable side wall, such as about seventy-five percent or more, such as about eighty percent or more, such as about ninety percent of the length. Also by way of example and still with reference to FIGS. 11 and 14 particularly, the single slot 196 may extend across about two-thirds or more of the height of each respective permeable side wall, such as about seventy-five percent or more, such as about eighty percent or more, such as about ninety-five percent of the length (e.g., as illustrated in FIGS. 13 and 14).

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A recreational vehicle air conditioner defining a vertical direction, a lateral direction, and a transverse direction, the recreational vehicle air conditioner comprising:
   an indoor cover defining an indoor portion and an outdoor portion;
   an outdoor heat exchanger and an outdoor fan disposed in the outdoor portion;
   an indoor heat exchanger and an indoor fan disposed in the indoor portion;
   an indoor panel positioned below the indoor fan along the vertical direction, the indoor panel defining an air inlet and an air outlet; and
   an acoustic insert comprising a solid top wall oriented approximately perpendicular to the vertical direction and at least one permeable side wall extending downward along the vertical direction from an outer edge of the solid top wall approximately perpendicular to the solid top wall, the solid top wall defining an entire uppermost surface of the acoustic insert, the acoustic insert positioned between the indoor panel and the indoor fan along the vertical direction, whereby the acoustic insert dampens sound transmitted through the indoor panel.

2. The recreational vehicle air conditioner of claim 1, wherein the acoustic insert comprises a box shape having a plurality of permeable side walls and an open bottom end, wherein the open bottom end of the acoustic insert faces the air outlet of the indoor panel.

3. The recreational vehicle air conditioner of claim 1, wherein the at least one permeable side wall is perforated.

4. The recreational vehicle air conditioner of claim 1, wherein the at least one permeable side wall comprises a single slot formed therein, the single slot extending across a majority of a length and a majority of a height of the at least one permeable side wall.

5. The recreational vehicle air conditioner of claim 1, wherein the acoustic insert is mounted to the indoor panel directly above the air outlet, whereby the solid top wall of the acoustic insert completely obstructs any straight line flow paths along the vertical direction through the air outlet.

6. The recreational vehicle air conditioner of claim 1, further comprising a sleeve extending between an outer grille of the recreational vehicle air conditioner and the indoor panel, wherein the indoor panel is configured to mount on a ceiling of a recreational vehicle, the outdoor grille is configured to mount on a roof of the recreational vehicle, and the sleeve is configured to extend continuously from the roof of the recreational vehicle to the ceiling of the recreational vehicle.

7. The recreational vehicle air conditioner of claim 6, wherein the sleeve is a non-ducted sleeve.

8. The recreational vehicle air conditioner of claim 6, wherein the sleeve comprises a first duct connecting port and a second duct connecting port.

9. The recreational vehicle air conditioner of claim 8, wherein the acoustic insert is aligned with and positioned between the first duct connecting port and the second duct connecting port.

10. The recreational vehicle air conditioner of claim 1, wherein the entire uppermost surface of the acoustic insert defines a single flat pane approximately perpendicular to the vertical direction.

11. A recreational vehicle that defines a passenger compartment therein, the recreational vehicle defining a vertical direction, a lateral direction, and a transverse direction, the recreational vehicle comprising:

a ceiling defining an opening into the passenger compartment;

a recreational vehicle air conditioner mounted to the ceiling at the opening, the recreational vehicle air conditioner comprising:

an indoor cover above the ceiling along the vertical direction, the indoor cover defining an indoor portion and an outdoor portion;

an outdoor heat exchanger and an outdoor fan disposed in the outdoor portion;

an indoor heat exchanger and an indoor fan disposed in the indoor portion;

an indoor panel positioned below the indoor fan along the vertical direction, the indoor panel defining an air inlet and an air outlet; and an acoustic insert comprising a solid top wall oriented approximately perpendicular to the vertical direction and at least one permeable side wall extending downward along the vertical direction from an outer edge of the solid top wall approximately perpendicular to the solid top wall, the solid top wall defining an entire uppermost surface of the acoustic insert, the acoustic insert positioned between the indoor panel and the indoor fan along the vertical direction, whereby the acoustic insert dampens sound transmitted from the recreational vehicle air conditioner into the passenger compartment.

12. The recreational vehicle of claim 11, wherein the acoustic insert comprises a box shape having a plurality of permeable side walls and an open bottom end, wherein the open bottom end of the acoustic insert faces the air outlet of the indoor panel.

13. The recreational vehicle of claim 11, wherein the at least one permeable side wall is perforated.

14. The recreational vehicle of claim 11, wherein the at least one permeable side wall comprises a single slot formed therein, the single slot extending across a majority of a length and a majority of a height of the at least one permeable side wall.

15. The recreational vehicle of claim 11, wherein the acoustic insert is mounted to the indoor panel directly above the air outlet, whereby the solid top wall of the acoustic insert completely obstructs any straight line flow paths along the vertical direction through the air outlet.

16. The recreational vehicle of claim 11, further comprising a sleeve extending between the indoor panel and an outer grille of the recreational vehicle air conditioner mounted on a roof of the recreational vehicle, wherein the indoor panel is mounted on the ceiling of the recreational vehicle, and the sleeve extends continuously from the roof of the recreational vehicle to the ceiling of the recreational vehicle.

17. The recreational vehicle of claim 16, wherein the sleeve is a non-ducted sleeve.

18. The recreational vehicle of claim 16, wherein the sleeve comprises a first duct connecting port and a second duct connecting port.

19. The recreational vehicle of claim 18, wherein the acoustic insert is aligned with and positioned between the first duct connecting port and the second duct connecting port.

20. The recreational vehicle of claim 11, wherein the entire uppermost surface of the acoustic insert defines a single flat pane approximately perpendicular to the vertical direction.

* * * * *